Sept. 16, 1952     C. A. ROYER     2,610,398
SHEET METAL CUTTING TOOL
Filed May 28, 1948
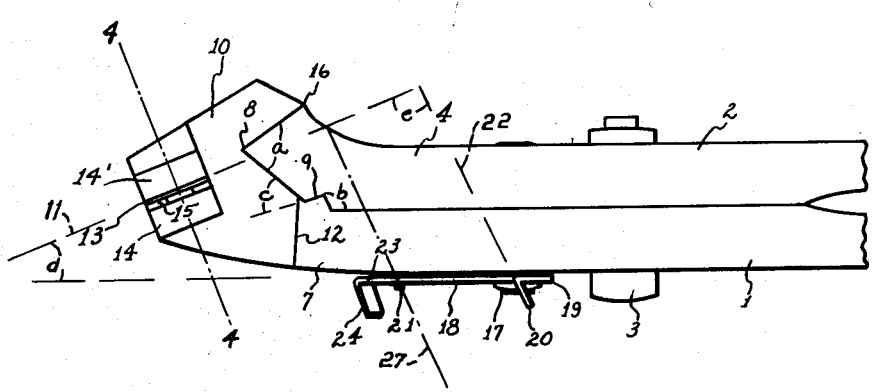
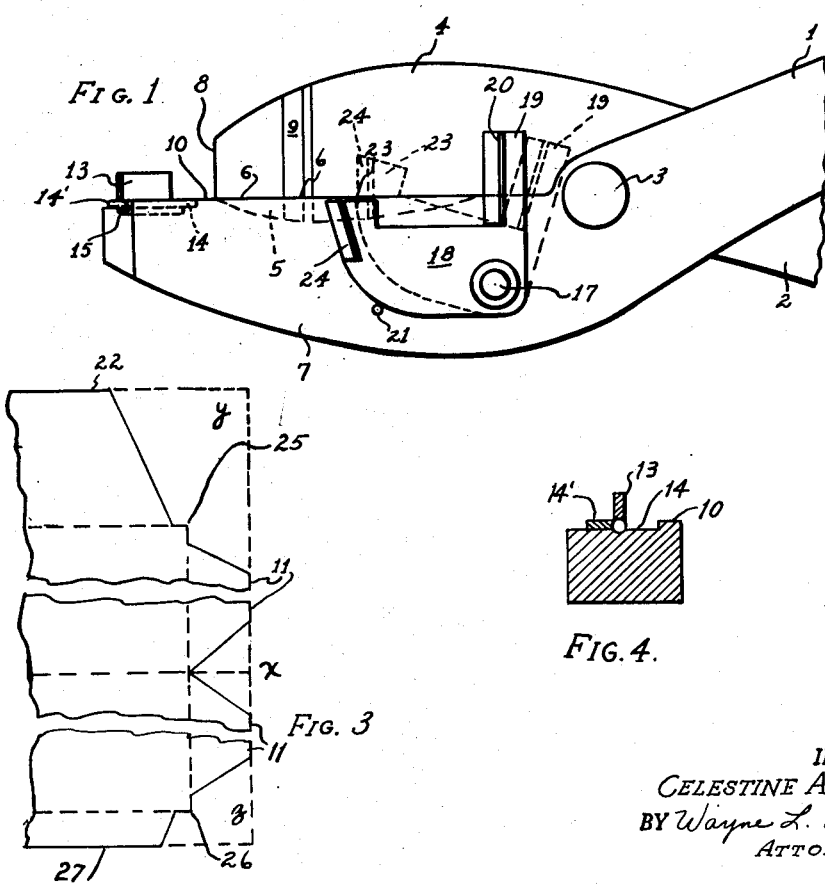
INVENTOR.
CELESTINE A. ROYER
BY Wayne L. Benedict
ATTORNEY Patented Sept. 16, 1952

2,610,398

UNITED STATES PATENT OFFICE 2,610,398

SHEET METAL CUTTING TOOL

Celestine A. Royer, Champaign, Ill., assignor to R. H. Bishop Company, Champaign, Ill., a corporation of Illinois Application May 28, 1948, Serial No. 29,755

2 Claims. (Cl. 30—229)

This invention relates to a hand tool for cutting sheet metal preparatory to the formation of a Pittsburgh joint or lock.

The present practice for cutting sheet metal in the fabrication of joints or locks, particularly in small shops and for "on the job" fabrication, is to lay out the portion to be cut with chalk or pencil directly on the sheet, and to use standard sheet metal shears or tin snips to make the cutout. This practice is time consuming and subject to inaccuracies. In production work, dies are made and the cuttings are stamped or punched out on presses. These machines are not adaptable to small sheet metal shops, or for on the job cutting.

The present device is intended to furnish a tool by which the necessary cuts for the type of joint known as the Pittsburgh lock or joint can be formed.

The present tool is of about the same dimensions and is operated in a manner similar to a standard sheet metal shear or tin snip. It is of a size and shape adapted to be carried in a portable tool box, or on the person of the workman.

The device is a cross-arm tool, pivoted to form a pair of projecting shearing jaws shaped to make the desired cut, and guide means and indicia on one of the jaws whereby the different cuts necessary for the Pittsburgh joint can be made, each shape requiring but a single shearing operation.

Figure 1 is an elevation of the cutting head of which Figure 2 is a top view. Figure 3 illustrates the type of cuts that are necessary in sheet metal to make the Pittsburgh lock. The cuts are shown in the same size and proportion as those which a tool of the size illustrated would make.

Figure 4 is a sectional view taken transversely of the hinge construction along the line 4—4 of Figure 2, as viewed from the left side of Figure 2.

Referring to Figure 1, the device is a cross-arm tool having cross arms 1 and 2 suitably pivoted at 3. The arms 1 and 2 terminate in suitable gripping handles, not shown, for example such as are used for shears, tin snips, and the like. The upper cutting jaw 4 is shaped to provide a shearing edge 5 shown in dotted lines in relation to shearing face 6 of the lower jaw 7. As the two faces pass each other they provide shearing action in the usual way. The upper cutting jaw 4 has an angular projection 8, the included angle, $a$, of which is suitably 75° corresponding to the angle of notch X of Figure 3. A notch is provided in jaw 4 corresponding to the angular cutter 9, the angle, $b$, which is 116°. The sides of the notch 9 are at 90° to each other. This forms the corner tip 25 and 26 of Figure 3. The length of the sides of the notch are ⅛ inch although this can be varied depending on the size of the lock to be formed.

The nose of jaw 7 extends beyond the end of head 4 and is provided with a flat, horizontal surface upon which the sheet of metal rests. The nose is shaped to form a shearing connection with the angular projection 8 of jaw 4. The angle $c$ is 59°. The length of the side of projection 8 lowermost in the drawing (Figure 2) is suitably 1⅛ inch, and of the other side is ⅝ inch. This forms a notching tool by which a notch such as $x$ can be sheared. To do this the sheet metal is placed on the flat surface 10 of the jaw 7, the handles of the tool having been spread in the usual manner. The edge 11 of the sheet metal is brought even with guide or indicia line 12 scratched in the surface 10 of jaw 7, and with point 16. The metal is placed so that the apex of projection 8 is opposite the point at which the apex of the notch is to be. When the handles are brought together in the usual way, the shearing faces of the male member 8 and the corresponding female member of jaw 7 cut through the material, leaving the V-shaped notch of the desired size and shape.

During this operation the hinged guide flap 13 rests in recess 14, flush with surface 10. Leaf 14' is anchored in any suitable way such as by welding, or by screws, in recess 14. The hinge 15 may be torsion spring loaded to hold the leaf 13 in the upright position shown, except when performing the notching operation just described. In the latter case, the leaf is pressed down into the notch and is held there by the sheet metal resting on it.

For the cuts Y and Z, the hinged leaf 13 is in the position shown in Figure 1. The leaf is mounted at an angle on the platform 10 such that the angle, $d$, is 22°. The cuts Y and Z are made by three shearing sections; a first section to the right of the angular cutter 9, which is the second shearing section, and a third shearing section forwardly thereof, and forming the lower side of the included angle, $a$, as shown in Figure 2.

Mounted on the side of jaw 7 by pivot pin 17 is an adjustable stop device 18. A vertical wing 19 has a guide projection 20 formed by bending a part of the material outwardly and backward to form an included angle of 68°. Thus the angle $e$ is 90°. When the stop is in the position shown in full lines in Figure 1, it is prevented from moving beyond the point where arm 19 is in its proper vertical position, by pin 21 set in jaw 7.

Thus sheet metal, trimmed to 90° angle at the corner as shown in Figure 3, is inverted and set into the open jaws of the tool with edge 11 resting against leaf 13 and the other edge 22 against projection 20. When the shears are closed, the cutter 5 makes a cut as shown at Y.

To make the shallower cut Z, the stop 18 is rotated into the position shown by the dotted lines in Figure 1. The member 19 rests against pin 3. The member 23 having the angular projection 24 extends above the level of surface 10 of jaw 7 so that projection 24 is vertically perpendicular to that surface. When the sheet material is placed between the jaws, still held inverted from the position shown in Figure 3, and the jaws are then closed, in a manner such as above described, the cut Z is made. In this case the edge 11 is placed against the leaf 13 and the edge 27 is placed against the projection 24. The position of the edge 27 for this cut is shown at the dotted line 27 in Figure 2.

To make similar cuts in opposite corners, the material (or the cutter) is turned over. The Pittsburgh lock is formed in the usual manner by proper bending of the edges of the metal.

I claim as my invention:

1. A hand tool for cutting sheet metal preparatory to forming a joint comprising a pair of crossed arms having cooperating cutting jaws, pivot means joining the arms and maintaining the jaws in cutting relation, said jaws forming a first straight shearing section, a second shearing section of V-shape forwardly of said first shearing section and having a 90° angle at its apex and a third straight shearing section forwardly of said second shearing section and lying at an obtuse angle to said first shearing section, a flat work receiving platform on one of said jaws projecting beyond the forward end of the other of said jaws, a recess in the surface of said platform adjacent said third shearing section, a guide hinged within said recess and adjustable from a position within said recess to a position in which the guide projects perpendicularly from the surface of the platform, a stop attached to said one jaw adjacent said first shearing section, said guide and stop being arranged to engage the edges adjacent the corner of a metal sheet to position the sheet on said platform for severing the corner from the sheet by said first, second and third shearing sections.

2. A tool as described in claim 1 in which said stop comprises a body member having its intermediate portion pivoted to said one jaw below said platform, said body member having an upwardly extending portion at each of its ends and being pivotally movable to position either of said upwardly extending portions for engaging the edge of a metal sheet on said platform.

CELESTINE A. ROYER.

REFERENCES CITED

The following references are of record in the file of this patent:

UNITED STATES PATENTS

| Number | Name | Date |
|---|---|---|
| 85,575 | Drake | Jan. 5, 1869 |
| 404,051 | Pattison | May 28, 1889 |
| 2,224,226 | Jensen | Dec. 10, 1940 |

FOREIGN PATENTS

| Number | Country | Date |
|---|---|---|
| 474,915 | France | Jan. 11, 1915 |